United States Patent [19]

Glusman et al.

[11] Patent Number: 5,596,499

[45] Date of Patent: Jan. 21, 1997

[54] CONTROL LAW MODE SWITCHING BETWEEN RATE COMMAND AND ATTITUDE COMMAND CONTROL SYSTEMS

[75] Inventors: Steven I. Glusman, West Chester, Pa.; Terry M. Black, New Castle, Del.

[73] Assignee: The Boeing Company, Seattle, Wash.

[21] Appl. No.: 391,556

[22] Filed: Feb. 21, 1995

[51] Int. Cl.$^6$ ........................................... B64C 13/08
[52] U.S. Cl. ............ 364/424.06; 364/183; 364/424.013; 364/553
[58] Field of Search .................... 364/424.06, 183, 364/553, 433, 434, 424.01

[56] References Cited

U.S. PATENT DOCUMENTS

| | | | |
|---|---|---|---|
| 3,568,960 | 3/1971 | Griffith et al. | 244/77 |
| 3,643,073 | 2/1972 | Sawamura | 235/150.2 |
| 3,837,603 | 9/1974 | Schultz et al. | 244/77 |
| 3,876,871 | 4/1975 | Sinner | 235/150.1 |
| 4,377,848 | 3/1983 | Flannigan et al. | 364/433 |
| 4,382,283 | 5/1983 | Clelford et al. | 364/434 |
| 4,451,878 | 5/1984 | Shigemasa | 364/553 |
| 4,456,862 | 6/1984 | Yueh | 318/561 |
| 5,016,177 | 5/1991 | Lambregts | 364/424.06 |
| 5,025,378 | 6/1991 | Kahler | 364/424.06 |
| 5,062,594 | 11/1991 | Repperger | 244/175 |
| 5,117,362 | 5/1992 | Peckham et al. | 364/433 |
| 5,127,608 | 7/1992 | Farineau et al. | 244/76 R |
| 5,138,555 | 8/1992 | Albrecht | 364/424.06 |
| 5,141,177 | 8/1992 | Wright et al. | 244/17.13 |

*Primary Examiner*—Kevin J. Teska
*Assistant Examiner*—Stephen J. Walder, Jr.
*Attorney, Agent, or Firm*—Jones, Tullar & Cooper, P.C.

[57] ABSTRACT

A method and system for controlling transitions between attitude command/response and rate command/response in an aircraft control system wherein the transfer function for a generic second order system is developed at current operating conditions and a predetermined constant damping. During a transition, trim follow-up frequency is changed progressively to coincide with the desired bandwidth, thereby effecting a pole-zero cancellation and converting the transfer function to that of a rate command/response system. Actuators, responsive to signals produced by the control, change aircraft parameters by altering the position of the main rotor and tail rotor control system in accordance with pilot input signals.

18 Claims, 3 Drawing Sheets

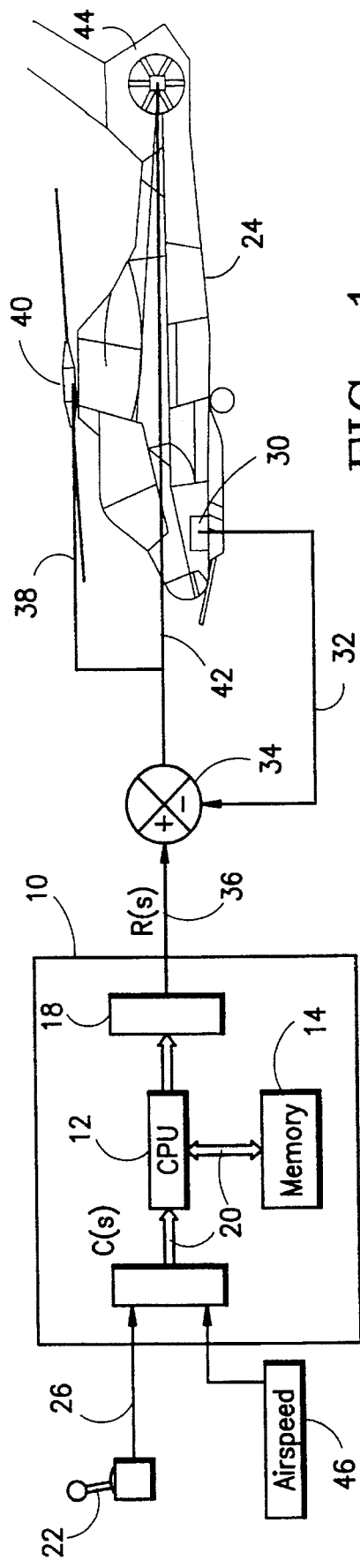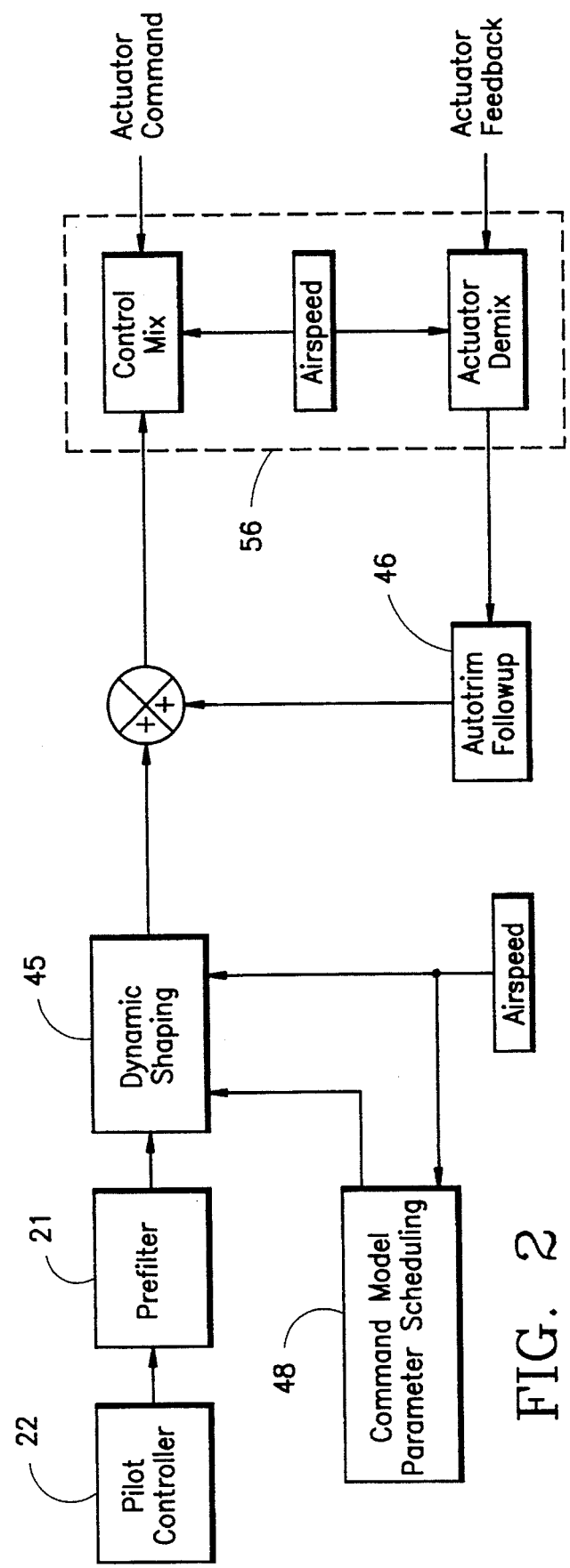

CONTROL LAW MODE SWITCHING BETWEEN RATE COMMAND AND ATTITUDE COMMAND CONTROL SYSTEMS

This invention was conceived or developed in the course of work under U.S. government contract No. DAAJ09-91-C-A004.

BACKGROUND OF THE INVENTION

1. Field of the Invention

This invention relates to the field of aircraft flight control systems. More particularly, it pertains to multi-mode aircraft command and response switching between control systems best suited to differing requirements.

2. Prior Art

Modern helicopters are required to perform a wide variety of missions ranging from air-to-air combat at several thousand feet altitude to precision hovering within a few feet of ground in gusty air. The wide range of tasks the helicopter performs requires a control system that can be reconfigured rapidly and smoothly to provide aircraft responses appropriate for a given task. These multi-mode control systems are designed to accommodate requirements for varying command/response characteristics in accordance with flight conditions, speed, altitude, task, and the quality and nature of the visual scene available to the aircraft crew.

The benefit of adjusting the aircraft response characteristics to the mission being performed in the available visual cue environment is well known. Generally, the more degraded the available visual cues, the higher the level of stability required to achieve acceptable handling qualities. Aeronautical design standards require various levels of command/stabilization for varying levels of visual cue environments.

In some cases, changes in aircraft response to account for poor visual cues or to provide improved precision maneuvering capability are made automatically, with reference to groundspeed, airspeed, or some other measurable variable. Usually the pilot is required to initiate these mode changes by engaging a selectable control or stabilization mode such as hover hold or precision flight mode. These control modes are selected for specific purposes including precision flight mode for aerial refueling or shipboard landing, hover hold for external cargo hook-up, and velocity hold for constant airspeed flight.

In current aircraft, discrete paths within the flight control system are included to vary the command/response shaping and provide the pilot with the desired level of command or stability augmentation. An example of this is control law mode switching from a baseline automatic flight control system (AFCS) to a precision flight mode (PFM). Switching between these modes is controlled by a transient free switch, which slowly closes an outer-loop around a lateral axis command model. The outer loop closure causes the command model to produce an attitude-type response as opposed to the rate-type response produced when the outer loop is open. Although this manner of switching provides the required function at the end points before and after the switching dynamics have settled, the command/response characteristics during switching are poorly conditioned and very unpredictable. While the transient free switch is changing state, i.e., neither fully opened nor fully closed, response of the command model to a fixed input is dynamic and damping varies while the transition occurs.

In demonstrator aircraft, lateral axis control laws switch from an attitude command system in low-speed flight to a rate command system in higher speed flight using several transient free switches tuned to provide acceptable intermediate states during the mode transition. However, when command model gains are altered, these transient free switch rates require additional tuning to provide acceptable transient response during mode changes.

In these demonstrator aircraft, the primary flight control system (PFCS) feed-forward shaping, as applied to the longitudinal axis, is switched to an alternate shaping path for AFCS operation. Command through one of these parallel paths is controlled by a transient free switch. While switching between these control systems, the slow transient free switch rate reduces sudden commands caused by the dissimilar AFCS and PFCS feed-forward shaping filters. This implementation may cause liftoff transients, i.e., noncommanded inputs when switching between PFCS and AFCS, if controller input is present.

The main rotor of a helicopter rotatably supports blades having an airfoil shape, which produce aerodynamic lift or thrust as the blades pass through the air. A pitch link attached to each blade changes the angle of attack by applying control force to the blade and rotating it about its pitch axis, thereby affecting the magnitude of lift produced by the rotor. The opposite end of each pitch link is connected to a rotating swashplate, which is connected to a stationary, nonrotating ring located below the rotating ring by bearings, which allow relative rotation of the rings and hold them at the same angle and relative axial position along the rotor shaft. The stationary ring can be raised and lowered along the axis of the rotor shaft, or tilted with respect to that axis by action of control servos or actuators, a longitudinal servo and multiple lateral servos.

To change the angular position of rotor lift, the pitch of each blade is changed individually, i.e., cyclic pitch is applied by causing the longitudinal servo to tilt the rings and main rotor about the rotor shaft. To change the magnitude of rotor lift, the pitch of all blades is change concurrently by raising the rings along the rotor shaft by the same amount, i.e., collective pitch is applied by causing the lateral servos to raise the rings relative to the main rotor.

To prevent a single rotor helicopter from rotating continually about its rotor axis, a tail rotor is used to produce a thrust force directed laterally that compensates for main rotor torque. This stabilizes the yaw heading and attitude of the aircraft against wind gusts and changes in main rotor torque. By overcompensating and undercompensating for these transients, the pilot changes the angular position of the aircraft about the yaw axis.

The magnitude of the tail rotor thrust varies with changes in pitch or angle of attack of the tail rotor blades resulting from raising and lowering a rotating swashplate connected by pitch links to the blades. The position of the swashplate is changed while maintaining its angular position constant so that tail rotor blade pitch changes collectively. Conventionally, the tail rotor thrust is controlled by pilot manipulation of control pedals connected by cables, bellcranks and push-pull rods to the tail rotor controls.

SUMMARY OF THE INVENTION

An object of this invention is to provide a technique for switching between command/response systems through the use of pole-zero cancellation embedded within a generic second order system. This technique allows for a continuous transition to occur during which the response of the system is bounded between the two desired responses, and damping associated with each response is held constant at a desired value.

To avoid the difficulties and other shortcomings of previous control mode switching techniques, a helicopter flight control has been developed to accommodate switching between an attitude control system and a rate control system. The switching occurs automatically, smoothly, with constant damping throughout the mode change.

A method according to this invention includes producing a pilot command representing a desired change in magnitude of an aircraft parameter, and determining whether the desired response to the command is better provided by a control system characterized by a second order transfer function or by a control system characterized by a first order transfer function. A first transfer function is developed for a dynamic system of second order having poles at a natural frequency of the desired response and a zero at a trim follow-up frequency. A second transfer function is derived with reference to the first transfer function by equating the trim follow-up frequency to the natural frequency of the desired response. The desired response is produced from the first transfer function and the pilot command if the response is to be provided by a control system characterized by a second order transfer function, or from the second transfer function and the pilot command if the response is to be provided by a control system characterized by a first order transfer function. Then the response is used to drive an actuator that alters the main rotor or tail rotor control system of the aircraft to change the current magnitude of the aircraft parameter to the desired magnitude of the parameter.

The technique is particularly suited to use with a flight control computer system. When the invention is employed with the aid of a computer, the method includes providing the computer with an algorithm that repetitively derives a first transfer function of second order having poles at a natural frequency of the desired response and a zero at a trim follow-up frequency. The computer is continually provided with the current magnitude of the independent variable, and computer memory contains a reference magnitude of the independent variable at which a switch occurs from a control system characterized by a second order transfer function to a control system characterized by a first order transfer function. The computer determines, by a comparison of the current magnitude of the independent variable and a reference magnitude, whether the desired response is to be provided by a control system characterized by a second order transfer function or by a control system characterized by a first order transfer function. The computer derives the second transfer function from the first transfer function by equating the trim follow-up frequency to the natural frequency of the desired response. Then the computer repetitively produces response signals from the first transfer function or second transfer function depending on whether the response is better provided by a control system having a first order transfer function or second order transfer function.

A system according to this invention includes a controller operated by the pilot for producing control input representing a desired change in an aircraft parameter. A sensor produces a signal representing the current magnitude of an independent variable, such as airspeed. Stored in electronic memory is a reference magnitude of the independent variable at which a switch occurs from a control system characterized by a second order transfer function to a control system characterized by a first order transfer function. The memory contains an algorithm for developing a first transfer function of a dynamic system of second order having poles at a natural frequency of the desired response and a zero at a trim follow-up frequency. The algorithm also develops a second transfer function from the first transfer function by equating the trim follow-up frequency to the natural frequency of the desired response so that a pole and zero of the first transfer function are cancelled. A computer having a central processing unit accessible to the memory and to information provided by the controller and sensor executes the algorithms. The computer produces, from the appropriate transfer function and the input produced by the controller, a command signal representing a commanded magnitude of the parameter. An actuator connected to a control surface alters the control surface in response to the command signal to produce the desired change in the parameter.

BRIEF DESCRIPTION OF THE DRAWINGS

FIG. 1 is a schematic diagram showing a flight control system according to this invention adapted for use with a flight control computer to the main rotor and tail rotor of a helicopter.

FIG. 2 is a schematic block diagram showing the relationship of software modules containing the control laws of a helicopter control system.

DESCRIPTION OF THE PREFERRED EMBODIMENT

Figure 3:
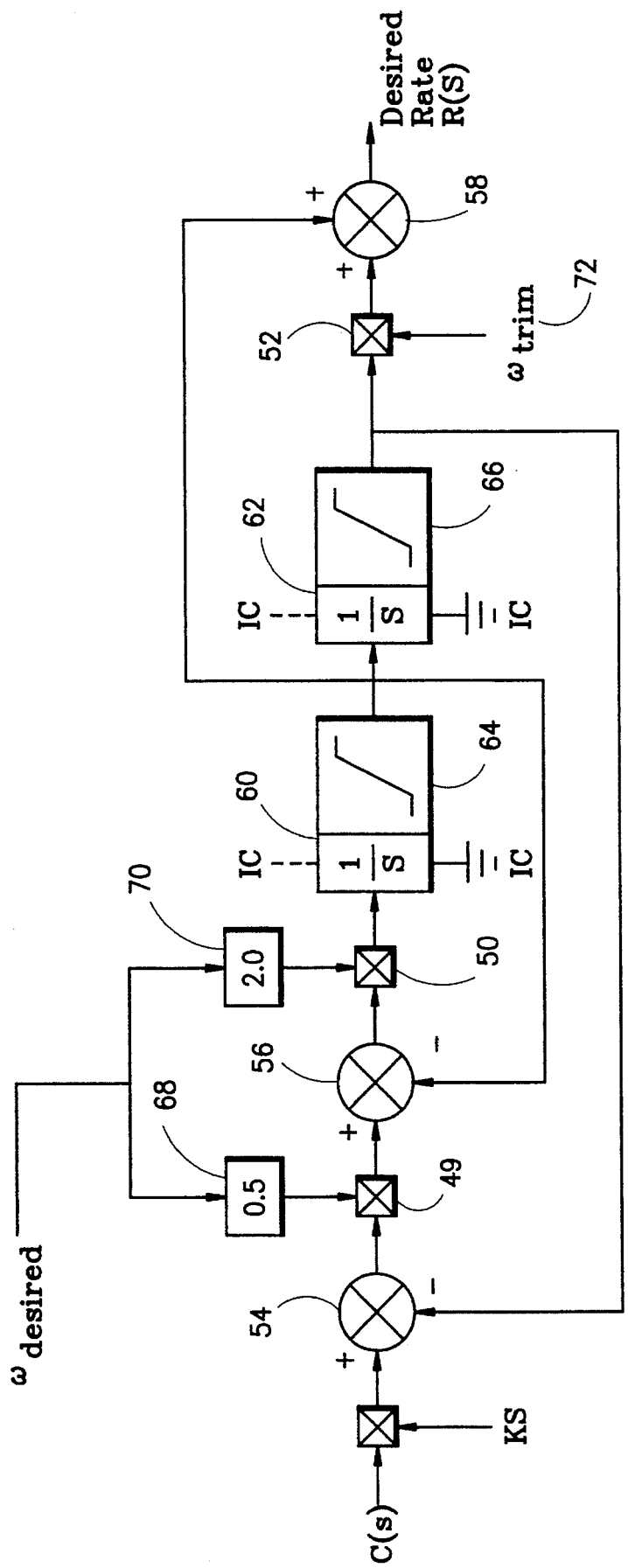
FIG. 3 is a schematic diagram representing the logic of an algorithm executed by a computer to determine the transfer function of a generic dynamic system of second order.

A control system, which is rapidly and smoothly reconfigured between rate command/response and attitude command/response modes according to this invention, is described next with reference to a helicopter flight control carried out using an electronic flight control computer system, arranged as shown in FIG. 1. The system includes a computer 10 having an integrated central processing unit (CPU) 12; electronic memory 14 including read-only memory (ROM), in which data and algorithms for controlling the main rotor and tail rotor are stored permanently; read-write memory (RAM), where data read from various sensors are updated and stored for use during execution of the algorithms; input signal conditioning circuits 16 for scaling and converting analog input from various sensors to digital form for processing; output driver circuits 181 for converting digital output of the processor to electrical signals supplied to actuators, which manipulate the various aircraft control surfaces in response to those signals; and an address/data bus 20, on which digital communication among the input circuits, CPU, memory and output ports is carried. Input circuit 16 include digital prefilters as required on an axis-by-axis basis to ensure signal quality.

Controller 22, operated manually by the pilot, is connected to an input port of computer 10 through line 26, on which a command signal is generated by application of force to the controller to displace the controller in the direction corresponding to the relevant aircraft parameter, e.g., roll, pitch, yaw or lift. The command produced by the pilot, represented by the position and rate of change of position of controller 22, corresponds to the desired attitude and disposition of the rotors and magnitude of lift produced by the rotors. The pilot command, after processing in input circuit 16, is converted to the command signal C(S) carried on bus 20 to the CPU 12. Control algorithms stored in memory, preferably in the form of software modules, are executed by the computer to produce the commanded value R(S) of the relevant control parameter.

Execution of the algorithms results in a value of the relevant aircraft parameter, which is carried from the CPU on bus 20 for conditioning by output circuits 18. Signals, produced by gyroscopes 30 located on the aircraft structure representing the actual value of the parameters, are carried on lines 32 to subtraction node 34. The commanded value of the relevant parameter, represented by signal R(s), is carried on line 36 also to subtraction node 34. There, an error signal, the difference between the commanded value of the parameter and its actual value, is carried on lines 38 to actuators 40 located at the main rotor, and on lines 42 to an actuator 44 located at the tail rotor.

Typically the actuators produce changes corresponding to the commanded value of the relevant aircraft parameters in hydraulic, electrical or mechanical actuation systems. For example, the main rotor actuators 40 alter main rotor collective pitch and main rotor cyclic pitch, which influence the magnitude of main rotor lift and the longitudinal and lateral disposition of main rotor lift vector with respect to reference roll, pitch, and yaw axes of the aircraft. The tail rotor actuator 44 changes the magnitude of tail rotor collective pitch and tail rotor thrust, which determines the directional heading or yaw attitude of the aircraft. In a fixed wing aircraft, the actuators manipulate control surfaces, such as a rudder, elevators and ailerons, in response to movement of the controller.

The control laws contained in the software modules of FIG. 2 provide command response shaping, automatic trim follow-up, and control mixing. Command module 45 provides the high frequency portion of the model-following command signal for all modes of control system operation. The desired response control laws, which are frequency-dependent shaping functions, are resident in this module. Characteristics of the frequency shaping are dependent on the flight regime inasmuch as the parameters are scheduled by airspeed. The command module is configured as either a rate command or attitude command depending on the mode selection logic. Variation from attitude command (a second order system) to rate command (a first order system) is accomplished by a pole-zero cancellation within the control system.

The trim function of the trim transfer follow-up module 46 stores all low-frequency trim requirements, which may result because of a change in flight conditions or constant disturbance. A trim map of control position versus airspeed is also included in this module to provide most of the aircraft trim requirement throughout the airspeed range.

Control mixing and demixing module 47 includes the control laws required to convert controller 22 inputs to actuator commands and to decouple responses. The actuator demix module demixes actuator positions for use in trim follow-up functions and control system initialization at start-up.

Parameter scheduling command module 48 handles the pole-zero cancellation for rate command and attitude command transitions. Airspeed drives the control algorithms of this module, which set maximum rates and attitude, control bandwidth, and other control variables. The output from an airspeed sensor is used as a basis to initiate, regulate, and terminate transitions between command modes. Generally when airspeed is relatively low, module 48 produces attitude command, and when airspeed is higher it produces rate command. The method for producing these transitions is described next.

The transfer gain from C(s) to R(s) of a generic dynamic system of order n, determined as illustrated in FIG. 2 for n=2, provides the basis for the technique of this invention to switch between attitude command and rate command. The model of the algorithm, executed in parameter scheduling module 48, includes arithmetic operations represented by multipliers 49, 50, 52; subtraction nodes 54, 56; addition node 58; integrators 60, 62; and limiters 64, 66. The algorithm also employs several constants, whose values are stored in, and recalled from electronic memory 14 at appropriate times during execution of the algorithm. The constants include gains 68, 70 and sensitivity gain $K_s$. Trim follow-up frequency $\omega_t$, a variable whose value is determined from a lookup table stored in memory and accessed with reference to the current speed of the aircraft (or another appropriate independent variable related to trim follow-up frequency), is recalled during execution. For example, the control system of an aircraft such as the V22, whose nacelle is at first angular position during takeoff and a second position during forward flight, may have trim follow-up frequency located in memory addressed by an independent variable other than airspeed, such as angular position of the nacelle.

The resulting transfer function is $$\frac{R(s)}{C(S)} = \frac{(K_s/\omega_t)(\omega_d^2(S+\omega_t))}{S^2 + 2\omega_d S + \omega_d^2}$$

wherein R(S) is the rate command signal for an attitude command model having sensitivity gain $K_s$, trim follow-up frequency $\omega_t$, and natural frequency of the desired response $\omega_d$. The Laplace operator is S, and the damping ratio is unity.

The sensitivity gain $K_s$, determined analytically, is a measure of the desired rate of response of the aircraft in the relevant axis. The desired natural frequency of the response $\omega_d$, sometimes called rolloff frequency or bandwidth, is determined with reference to the flight characteristics of the aircraft and response characteristics of the aircraft about the several reference axes. For example, a relatively high natural frequency of the response is desired for light, maneuverable aircraft, but a lower frequency is desired for those less maneuverable. Generally pitch response is fast in comparison to yaw and roll response; therefore, a relatively higher natural frequency is desired with respect to pitch axis response than is desired with respect to yaw axis response.

The denominator of the transfer function can be factored into the product of two terms $$\frac{R(s)}{C(S)} = \frac{(K_s/\omega_t)(\omega_d^2(S+\omega_t))}{(S+\omega_d)(S+\omega_d)}$$

During execution of the algorithms that determine the response signal due to the pilot command signal, aircraft speed is continually monitored to determine whether there is need to switch between attitude command and rate command modes. The trim follow-up frequency corresponding to current aircraft speed, or another independent variable, is determined from a lookup table, and the current transfer function is determined in accordance with the algorithmic model of FIG. 2.

If a switch from attitude command to rate command is required, trim follow-up frequency $\omega_t$ is changed at a predetermined, acceptable rate until it is equal to the natural frequency of the desired response $\omega_d$. Then the zero in the numerator of the transfer function is identical to the poles in the denominator, a pole-zero cancellation occurs, and the system will have completed gradually a transition to a simple rate command system with a first order lag term in the denominator. If a switch from rate command to attitude command is required, trim follow-up frequency $\omega_t$ is changed at a predetermined rate away from equality with the natural frequency of the desired response $\omega_d$ to the value of the lookup table corresponding to current airspeed. Then the transfer function produced by the algorithm defines an attitude command function, and the system will have completed a transition from rate command system to attitude command.

Figure 4:
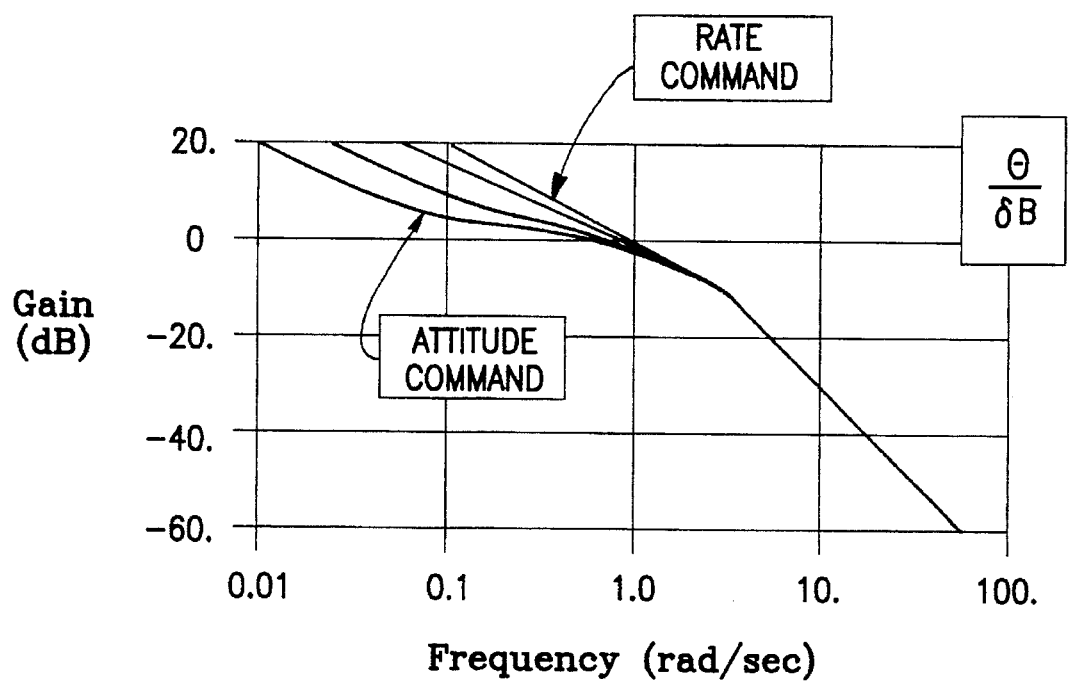
FIG. 4 is a Bode diagram for the system of FIG. 3 showing the variation of gain with frequency over a range of trim follow-up frequency between rate command and attitude command boundaries.
Figure 5:
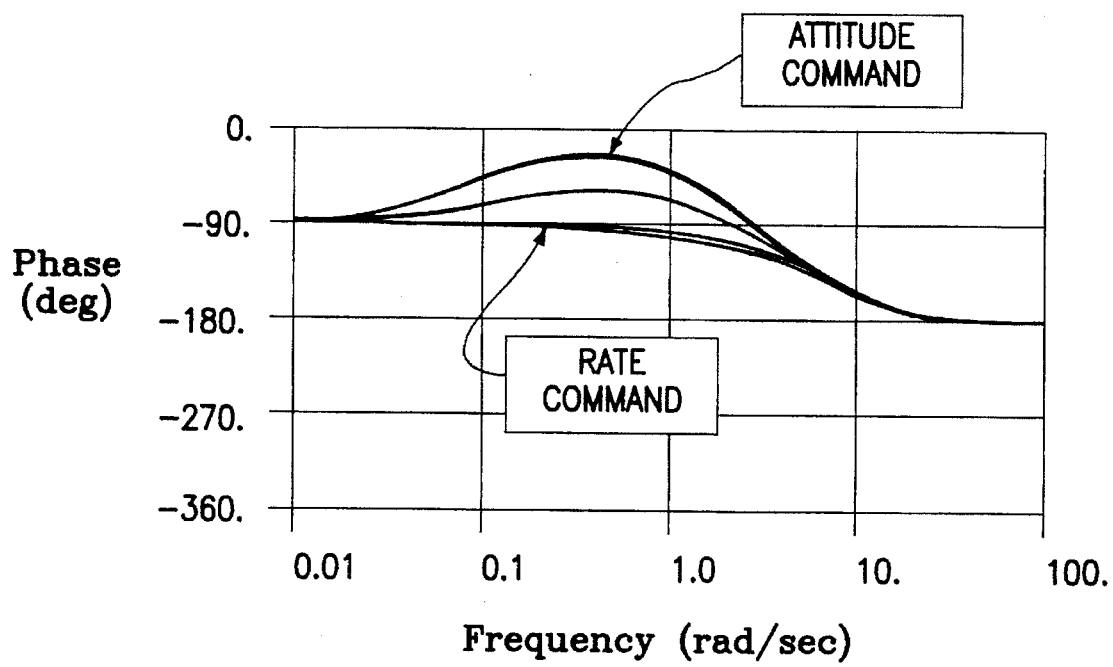
FIG. 5 is a Bode diagram for the system of FIG. 3 showing the variation of phase with frequency over a range of trim follow-up frequency bounded by rate command and attitude command limits.

Operation in the attitude command mode is desirable where precise response of the aircraft to command input is required. However, when operating under conditions that require fast change of pitch or roll disposition, rate command is preferred. As indicated in the diagrams of FIGS. 4 and 5, a transition between an attitude command system and a rate command system is achieved by altering the trim follow-up frequency at a predetermined rate, preferably approximately 0.10 radians per second. This rate produces a progressive increase in gain and faster response to the pilot command. FIG. 5 shows the phase characteristics of the two command/response control modes during transitions between them.

As a transition from a rate command system to an attitude command system is accomplished, the pilot is virtually unaware that a change between modes is occurring because damping is constant during the transition and sensitivity varies with the trim follow-up rate. The damping ratio of the first and second transfer functions is unity. During transitions between modes, the control/response transfer function is contained over the range of trim follow-up frequency between rate command and attitude command boundaries.

Although the invention is illustrated and described with reference to a helicopter having a computer-based control system, the invention is neither limited to use with a computer nor to a helicopter. Instead, the invention may be carried out with discrete digital or analog electronic components, and it can be applied to control a fixed-wing aircraft. Moreover, the invention can be applied to the control of virtually any system requiring a transition, or repetitive transitions between a second order attitude command/response and a first order rate command/response.

We claim:

1. A method for switching between command/response modes in a flight control system that controls the magnitude of an aircraft parameter, the method comprising the steps of:

producing a command representing a desired change in magnitude of the parameter;

determining whether the desired response to the command is to be provided by a control system characterized by a second order transfer function or by a control system characterized by a first order transfer function;

developing a first transfer function for a dynamic system of second order having poles at a natural frequency of the desired response and a zero at a trim follow-up frequency;

developing a second transfer function from the first transfer function by equating the trim follow-up frequency to the natural frequency of the desired response;

producing a response from the first transfer function and said command if the response is to be provided by a control system characterized by a second order transfer function, and from the second transfer function and said command if the response is to be provided by a control system characterized by a first order transfer function; and applying the response to a control surface of the aircraft to change the current magnitude of the parameter to the desired magnitude of the parameter.

2. The method of claim 1 further comprising:

determining the actual magnitude of the parameter;

comparing the actual magnitude of the parameter and the response to the command for a change in magnitude of the parameter, and producing therefrom an error signal representing the difference therebetween; and applying said error signal to drive an actuator adapted to change the magnitude of the parameter.

3. The method of claim 1 wherein the step of determining whether the desired response is to be provided by a control system characterized by a second order transfer function or by a control system characterized by a first order transfer function, comprises:

determining the current magnitude of an independent variable related to operation of the aircraft;

determining a reference magnitude of the independent variable at which a switch occurs from a control system characterized by a second order transfer function to a control system characterized by a first order transfer function; and comparing the current magnitude of the independent variable and reference magnitude of the independent variable and producing therefrom an indication of whether the first transfer function or second transfer function is desired.

4. The method of claim 1 wherein the step of developing a second transfer function comprises:

changing the magnitude of the trim follow-up frequency in the first transfer function to the magnitude of the natural frequency of the desired response; and cancelling a pole and zero of the first transfer function; and retaining as the second transfer function the terms of the first transfer function that remain after said cancellation.

5. The method of claim 1 wherein the step of developing a second transfer function comprises:

determining the current magnitude of an independent variable related to operation of the aircraft;

determining a desired magnitude of the trim follow-up frequency corresponding to the current magnitude of said independent variable;

determining a reference magnitude of the independent variable at which a switch occurs from a control system characterized by a second order transfer function to a control system characterized by a first order transfer function;

changing the magnitude of trim follow-up frequency to the desired magnitude of trim follow-up frequency corresponding to the current magnitude of said independent variable in the first transfer function until the trim follow-up frequency equals the natural frequency of the desired response; and cancelling the pole and zero of the first transfer function; and retaining as the second transfer function the remainder of the first transfer function that remains after said cancellation.

6. The method of claim 1 wherein the step of developing a first transfer function comprises:

developing a transfer function of the form $$\frac{R(s)}{C(S)} = \frac{(K_s/\omega_t)(\omega_d^2(S+\omega_t))}{S^2 + 2\omega_d S + \omega_d^2}$$

wherein R(S) is the response for an attitude command model, C(S) is the command, $K_s$ is sensitivity gain, $\omega_t$ is trim follow-up frequency, $\omega_d$ is the natural frequency of the desired response, and S is the Laplace operator.

7. The method of claim 1 wherein the step of developing a second transfer function comprises:

developing a first transfer function of the form $$\frac{R(s)}{C(S)} = \frac{(K_s/\omega_t)(\omega_d^2(S+\omega_t))}{S^2 + 2\omega_d S + \omega_d^2}$$

wherein R(S) is response signal for an attitude command model, C(S) is the command, $K_s$ is sensitivity gain, $\omega_t$ is trim follow-up frequency, $\omega_d$ is the natural frequency of the desired response, and S is the Laplace operator;

determining the current magnitude of an independent variable related to operation of the aircraft;

determining a desired magnitude of the trim follow-up frequency corresponding to the current magnitude of said independent variable;

determining a reference magnitude of the independent variable at which a switch occurs from a control system characterized by a second order transfer function to a control system characterized by a first order transfer function;

comparing the reference magnitude of the independent variable and current magnitude of the independent variable and determining from said comparison whether a switch is required from a control system characterized by a second order transfer function to a control system characterized by a first order transfer function;

changing the magnitude of trim follow-up frequency to the desired magnitude of trim follow-up frequency corresponding to the current magnitude of said independent variable in the first transfer function until the trim follow-up frequency equals the natural frequency of the desired response;

cancelling the pole and zero of the first transfer function; and retaining as the second transfer function the remainder of the first transfer function that remains after said cancellation.

8. The method of claim 7 wherein the independent variable is airspeed, and the step of changing the magnitude of trim follow-up frequency comprises changing said magnitude at a predetermined rate of approximately 0.10 radians per second.

9. The system of claim 1, further comprising input conditioning means for scaling and converting information produced by the controller means and sensor means in analog form to digital form; and output driver means for converting output produced by the computer in digital form to an analog signal that drives the actuator.

10. A method for switching between command/response modes in a flight control system that controls the magnitude of an aircraft parameter with the aid of a computer having access to a memory, the method comprising the steps of:

producing a command representing a desired change in magnitude of the parameter;

providing the computer with an algorithm that repetitively derives a first transfer function for a dynamic system of second order having poles at a natural frequency of the desired response and a zero at a trim follow-up frequency;

continually providing the computer with the current magnitude of an independent variable related to operation of the aircraft;

storing in computer memory a reference magnitude of the independent variable at which a switch occurs from a control system characterized by a second order transfer function to a control system characterized by a first order transfer function;

repetitively comparing in the computer the current magnitude of the independent variable and reference magnitude of the independent variable and determining from the comparison whether the desired response is to be provided by a control system characterized by a second order transfer function or by a control system characterized by a first order transfer function;

repetitively deriving in the computer a second transfer function from the first transfer function by equating the trim follow-up frequency to the natural frequency of the desired response;

repetitively producing in the computer a response from the first transfer function and said command if the desired response is to be provided by a control system characterized by a second order transfer function, and a response from the second transfer function and said command if the desired response is to be provided by a control system characterized by a first order transfer function; and applying the response produced by the computer to a control surface of the aircraft to change the current magnitude of the parameter to the desired magnitude of the parameter.

11. The method of claim 10 wherein the step of deriving a second transfer function comprises:

repetitively changing in the computer the magnitude of the trim follow-up frequency of the first transfer function until the trim follow-up frequency equals the natural frequency of the desired response; and cancelling the pole and zero of the first transfer function; and retaining as the second transfer function the remainder of the first transfer function that remains after said cancellation.

12. The method of claim 10 wherein the step of calculating a second transfer function comprises:

storing in computer memory a lookup table containing a range of desired trim follow-up frequency corresponding to the current magnitude of said independent variable;

repetitively recalling from the look-up table by reference to current magnitude of said independent variable, the corresponding desired trim follow-up frequency;

continually changing in the computer the magnitude of trim follow-up frequency to the desired magnitude of trim follow-up frequency in the first transfer function until the trim follow-up frequency equals the natural frequency of the desired response;

cancelling the pole and zero of the first transfer function; and retaining as the second transfer function the remainder of the first transfer function that remains after said cancellation.

13. The method of claim 10 wherein the step of deriving a second transfer function comprises executing the algorithm and deriving therefrom a first transfer function of the form $$\frac{R(s)}{C(S)} = \frac{(K_s/\omega_t)(\omega_d^2(S + \omega_t))}{S^2 + 2\omega_d S + \omega_d^2}$$

wherein R(S) is the response for an attitude command model, C(S) is the command, $K_s$ is sensitivity gain, $\omega_t$ is trim follow-up frequency, $\omega_d$ is the natural frequency of the desired response, and S is the Laplace operator.

14. The method of claim 13 wherein the independent variable is airspeed, and the step of changing the magnitude of trim follow-up frequency comprises changing said magnitude at a predetermined rate of approximately 0.10 radians per second.

15. The method of claim 10 wherein the step of deriving a first transfer function comprises executing the algorithm and deriving therefrom a first transfer function of the form $$\frac{R(s)}{C(S)} = \frac{(K_s/\omega_t)(\omega_d^2(S + \omega_t))}{S^2 + 2\omega_d S + \omega_d^2}$$

wherein R (S) is response signal for an attitude command model, C(S) is the command, $K_s$ is sensitivity gain, $\omega_t$ is trim follow-up frequency, $\omega_d$ is the natural frequency of the desired response, S is the Laplace operator;

determining a desired magnitude of the trim follow-up frequency corresponding to the current magnitude of said independent variable;

repetitively changing in the computer the magnitude of trim follow-up frequency to the desired magnitude of trim follow-up frequency corresponding to the current magnitude of said independent variable in the first transfer function until the trim follow-up frequency equals the natural frequency of the desired response;

cancelling the pole and zero of the first transfer function; and retaining as the second transfer function the remainder of the first transfer function that remains after said cancellation.

16. The method of claim 10 further comprising:

determining the actual magnitude of the parameter;

comparing the actual magnitude of the parameter and the desired magnitude of the parameter and producing therefrom an error signal representing the difference therebetween; and applying said error signal to drive an actuator adapted to change the magnitude of the parameter.

17. A system for switching between command/response modes in a flight control system that controls an aircraft parameter, comprising:

controller means for producing control input representing a desired change in the parameter;

sensor means for producing the current magnitude of an independent variable;

electronic memory containing a reference magnitude of the independent variable at which a switch occurs from a control system characterized by a second order transfer function to a control system characterized by a first order transfer function, and an algorithm for developing a first transfer function for a dynamic system of second order having poles at a natural frequency of the desired response and a zero at a trim follow-up frequency and for developing a second transfer function from the first transfer function by equating the trim follow-up frequency to the natural frequency of the desired response;

computer means having a central processing unit accessible to said memory and to information provided by the controller means and sensor means, for changing the magnitude of the trim follow-up frequency in the first transfer function to the magnitude of the natural frequency of the desired response and cancelling a pole and zero of the first transfer function, and for producing from a transfer function and the input produced by the controller means a command signal representing a desired magnitude of said parameter; and an actuator connected to a control surface for manipulating the control surface in response to said command signal to produce the desired change in the parameter.

18. The system of claim 14, further comprising:

a sensor mounted on the aircraft for producing a signal representing the current magnitude of the parameter;

comparator means for comparing the actual magnitude of the parameter and the command signal, and for producing therefrom an error signal representing the difference therebetween; and means for applying said error signal to drive the actuator.

* * * * *

UNITED STATES PATENT AND TRADEMARK OFFICE
CERTIFICATE OF CORRECTION

PATENT NO. : 5,596,499
DATED : January 21, 1997
INVENTOR(S) : Steven I. Glusman et al It is certified that error appears in the above-indentified patent and that said Letters Patent is hereby corrected as shown below:

Claim 4, column 8, line 38, delete "and".

Claim 5, column 8, line 61, delete "and".

Claim 9, column 9, line 57, change "1" to --15--.

Claim 11, column 10, line 45, delete "and".

Signed and Sealed this

Fifteenth Day of April, 1997

Attest:

BRUCE LEHMAN

*Attesting Officer*  Commissioner of Patents and Trademarks